Jan. 1, 1952     C. A. LOVELL ET AL     2,580,446
HARMONIC GENERATOR
Filed Dec. 31, 1948
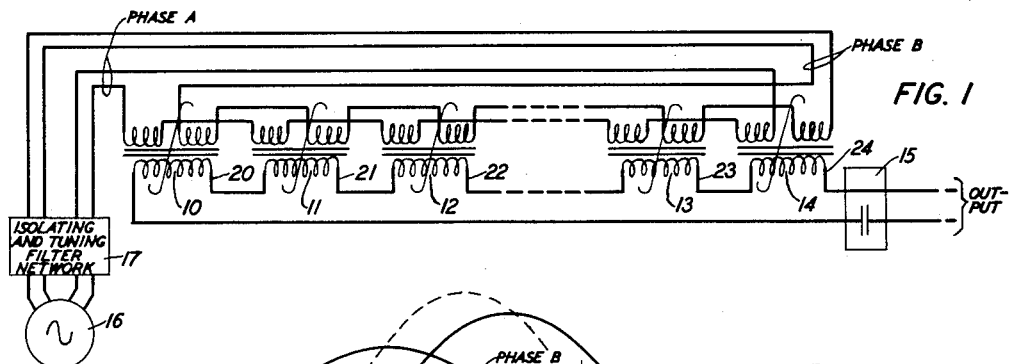
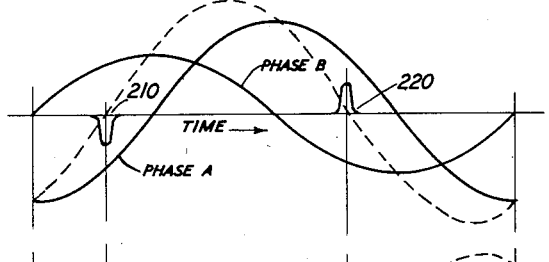
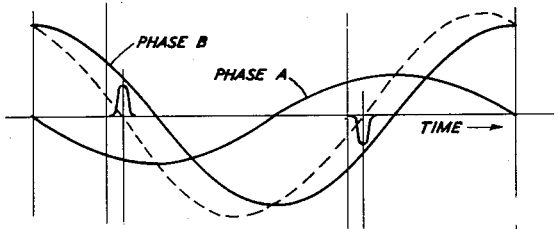
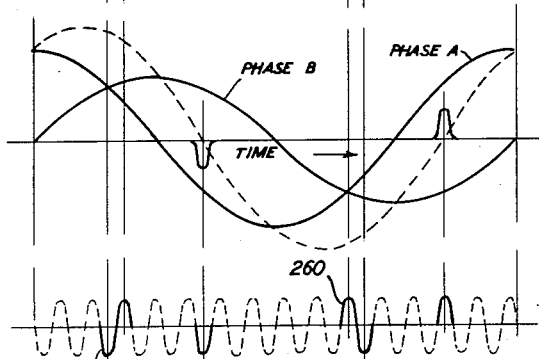
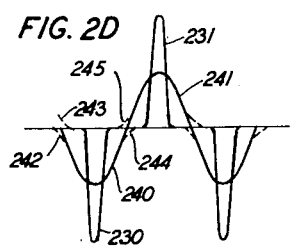
INVENTORS C. A. LOVELL
D. B. PARKINSON
BY William F. Simpson
ATTORNEY Patented Jan. 1, 1952

2,580,446

UNITED STATES PATENT OFFICE 2,580,446

HARMONIC GENERATOR

Clarence A. Lovell, Summit, N. J., and David B. Parkinson, Cleveland Heights, Ohio, assignors to Bell Telephone Laboratories, Incorporated, New York, N. Y., a corporation of New York Application December 31, 1948, Serial No. 68,555

7 Claims. (Cl. 321—68)

This invention relates to frequency changing systems and more particularly to harmonic static frequency changing systems for increasing the frequency of an alternating current.

The object of the present invention is to provide improved and simplified methods and apparatus for changing the frequency of an alternating current.

This invention more specifically relates to improvements in static frequency changes of the type set forth in United States Patent 1,917,921 granted July 11, 1933, to E. T. Burton. In that patent a source of alternating current and also a source of direct current are required to operate the static frequency apparatus.

It is the object of the present invention to provide equally satisfactory frequency changing apparatus which does not require the source of direct current.

Other frequency static changes in the prior art require polyphase alternating current supply, the frequency of which is to be increased. In said systems the output frequency bears a specific relationship of a number of phases of the polyphase of currents employed. Such frequency changes have been large and complicated and usually require coils and filters of special design.

It is an object of this invention to provide an improved harmonic frequency changer which employs a plurality of coils each of simple design and construction which are provided with three windings and a single core structure which is saturable.

A feature of this invention relates to a frequency changing arrangement in which the output frequency is not related to the number of phases of the supply frequency.

Another feature of the invention relates to apparatus and equipment for providing frequencies which are harmonically related to the supply frequency.

Another feature of this invention relates to a frequency changer which may produce a harmonic of a fundamental supply frequency when supplied with alternating current of two different phases of said supply frequency.

Another feature of this invention relates to frequency changing apparatus which may be readily changed to supply any desired number of phases of the high frequency output current therefrom.

Another feature of this invention relates to frequency changing and harmonic generators employing saturable reactors in which a substantial portion of the input power is converted into power of a high frequency.

Briefly, in accordance with this invention a coil is provided for each complete cycle of the output current desired for each cycle of the input current. The coils are provided with output windings which are connected together to form the desired output currents or voltages. These output windings may be connected in a single circuit in which case a single phase output current is provided. If suitable ones of the output windings are connected together multiphase output current may be provided.

The coils are supplied by an alternating current having two phases. In the exemplary embodiment set forth herein it is assumed that these phases are in phase quadrature or 90 degrees displacement. It is to be understood, however, that it is not essential that the two input phases have such a phase relation nor is it essential that they have any given phase relation. So long as the phase relation between the two phases remains the same and is the phase relationship between them for which the coils were designed, the harmonic frequency changer in accordance with this invention operates satisfactorily.

The coils are provided with a core of saturable material upon which are wound input windings for each phase and an output winding. Either the number of turns on the input windings of the respective phases or the voltages applied to the various phase windings of the various coils is all different and of sufficient magnitude to saturate the cores or at least a portion thereof. The amplitude of the applied two-phase alternating currents is of sufficient magnitude to saturate the individual cores. Each core is arranged to transmit a pulse each time the total flux through the core goes through zero. This will happen twice during each cycle, once in a positive direction and once in a negative direction thus generating in the output winding a positive pulse followed by a negative pulse or vice versa. The times during each cycle at which the flux through any given core goes through zero is adjusted by either adjusting the voltage applied to the different phases of the input windings or by varying or adjusting the number of turns in the respective windings.

The invention, the novel features of which are set forth in the claims appended hereto may be more readily understood from the following description when read with reference to the attached drawings in which:

Fig. 1 shows a circuit of an exemplary frequency changer embodying the present invention; and Figs. 2A, 2B, 2C, 2D, and 2E show graphs of the currents or voltages of the various windings of the coils so that the invention may more readily be described and understood.

As shown in Fig. 1, the frequency changer comprises a plurality of coils 10, 11, 12, 13 and 14. When five and only five such coils are provided the output current will be the fifth harmonic of the supply current. Any suitable number of coils may be provided depending upon the order of the desired output harmonic. Thus if the fifteenth harmonic is desired fifteen such coils will be provided. Each of these coils is provided with a core of saturable ferromagnetic material. The core material may comprise any desired type of magnetic material including transformer iron, silicon steel, any desired iron-nickel alloys of any suitable type including "Permalloy," or any other suitable alloys of iron, nickel, cobalt, manganese, etc., normally employed for magnetic cores. Each of these coils is provided with output windings 20, 21, 22, 23, 24 which are all connected in a single circuit and connected in series with the output circuit as shown in Fig. 1. When desired these windings may be connected in suitable manner including being connected in groups to provide polyphase output currents when so desired. In addition, each of the coils is provided with two input windings, one connected to a phase A of a polyphase source of alternating current 16, and the other connected to a phase B of a polyphase alternating current source 16. As shown in the drawings, all of the input windings are connected to each of the phases and all of the coils are connected in series. It is to be understood that when desired these coils may be connected in any desirable manner.

When the input windings are connected in series as shown in the drawings, the number of turns in the windings connected to the respective phases varies from coil to coil and as a result the time at which the flux through the magnetic core material goes through zero may be readily determined and may be adjusted so that it goes through zero at successive times for successive ones of said coils or it may go through zero in any desired order in accordance with the number of turns on the two input windings and the manner in which these input windings are connected to the supply frequency. When desired, the turns on the two inputs or primary windings may be adjusted so that the total flux through the respective cores is of substantially the same maximum amplitude. For the series circuit arrangement shown in the drawing and with the two phases of the supply power displaced by 90 degrees the same maximum amplitude in each core is obtained when $$\sqrt{N_1^2 N_2^2}$$

is a constant for all the coils where $N_1$ and $N_2$ are the number of turns on the two primary windings.

The output circuit passes through an output tuning network 15 which comprises a condenser in the exemplary embodiment set forth herein. Likewise, the input phases A and B are transmitted through an isolating and tuning filter network 17 to render operation of applicants' harmonic generator more reliable. When desired, this isolating and tuning filter 17, as well as the output tuning filter 15 may be omitted, if the power line is sufficiently free of voice frequency currents and if these harmonic currents do not interfere with the supply frequencies, or with the power system to which the frequency multiplier in accordance with this invention is connected. A two-phase source of alternating current 16 is shown in the drawing connected through the filter network 17 to the respective phases A and B which are connected to the frequency multiplying coils 10 through 14, inclusive. It is to be understood that this generator may be replaced by any suitable source of two-phase alternating current. It is also to be understood that the two-phase alternating current may be obtained by phase splitting or by other suitable means from a source of single phase of alternating current when desirable or necessary.

When the primary windings are connected in series as shown in the drawings it is desirable that the supply sources present a high impedance to the series circuits of the primary windings.

Fig. 2A represents the fluxes induced in the cores of one of the coils in response to the application of the two different phases of the supply frequency. Assume, for example, that Fig. 2A represents the two fluxes induced in the core of coil 11. The curve marked "phase A" represents the flux through the core of the coil due to the current flowing through the winding of this coil connected to phase A. The curve marked "phase B" represents the flux induced in the core or the ampere turns applied to the core by the currents flowing in the winding connected to phase B. The combined flux is shown by means of a dotted line in Fig. 2A. This combined flux is sufficient magnitude to saturate the core and passes through zero at times 210 and 220, with the result that a negative pulse is generated by the time 210 and a positive pulse at the time 220 in the output winding 21 of coil 11. These two pulses are shown by the solid lines 250 and 260 in Fig. 2E. During the next cycle of operations two similar pulses are again generated in the same relative positions within the cycle, that is, in the same relative position with respect to the voltage of the fundamental frequency. Fig. 2B shows the corresponding ampere turns applied to the core of the coil 12 due to the current flowing through the respective phase windings of the coil 12. Here again, the combined flux is shown by means of the dotted curve. In addition, additional pulses are generated in the output circuit of coil 12 at the time the combined flux of the core passes through zero. However, the times at which the flux goes through zero for coil 22 is not the same as the times at which the flux of coil 21 goes through zero, due to the fact that the turns of the respective primary windings are not the same and are instead adjusted so that the flux goes through zero at the desired or proper times. The curves or graphs of Fig. 2C show similar curves for the coil 13. The other coils operate in substantially the same manner and generate a pulse of each polarity for each complete cycle of the applied alternating current. When these pulses are all combined in the output circuit an output wave of the form shown in Fig. 2E is obtained in which the dotted curve shows the output wave form from all of the coils while the solid portions show the wave forms from the specific coils described above with reference to Figs. 2A, 2B and 2C.

Fig. 2D shows the pulses from coils 10 and 11 in amplified form and one manner in which they are combined in the output circuit. The graphs 230 and 231 illustrate the wave forms from these respective coils when a relative high voltage is applied to the primary windings. The higher the primary voltage and thus the higher the exciting current the greater the amplitude the pulses and the shorter their duration. As is well known the shorter the duration of the pulses the higher the frequencies in their frequency spectrums. When it is desired to secure only one harmonic frequency the exciting voltage may be adjusted so that the pulses from each coil have a duration a little greater than the time of a half cycle of the desired harmonic frequency so that the trailing part of one pulse will substantially cancel the leading part of the succeeding pulse and thus reduce the other frequency components in the output circuit. Such an adjustment is shown in Fig. 2D, when the pulses 240 and 241 have a time duration slightly greater than the time a half cycle of the desired output harmonic so that the trailing part 243 of one pulse substantially neutralizes the leading part 242 of the succeeding pulse 240. Likewise, the portions 244 and 245 substantially neutralize each other. The corresponding parts of succeeding pulses likewise also neutralize each other so that the output is substantially a pure sine wave of the desired harmonic frequency.

It is thus apparent that the output wave form comprises substantially all the desired harmonic voltage or current and thus contains substantially no fundamental and only a small amount of odd harmonics. As a result, the input and output tuning and isolating filter networks may be of a simple nature, such as the condenser 15 or any other suitable types of resonant or anti-resonant circuits or they may be dispensed with.

In the foregoing description it has been assumed that it is desirable to secure a single specified harmonic of the fundamental frequency. With this assumption the pulses in the output windings are uniformly spaced in time. However, such uniformity is not necessary. When it is desired to obtain more than one output frequency the pulses may be spaced in time as desired or certain pulses omitted. In addition as shown in the drawings, under the assumed conditions, the pulses in the output circuit all have substantially the same amplitude or magnitude. Here again such uniformity is not necessary. When desired the amplitudes of the various output pulses from the respective coils may be of any desired amplitudes all of which may or may not be different.

What is claimed is:

1. A harmonic generator comprising a plurality of saturable cores each providing an independent flux path, two primary windings interlinking each of said independent flux paths, apparatus for saturating at least a portion of each of said independent flux paths comprising means for interconnecting said primary windings to a polyphase alternating current source to cause the flux through said independent flux paths to pass through zero at different instants of time and an output winding individual to and interlinking each of said independent of flux paths.

2. A frequency increasing system comprising a plurality of saturable cores, two primary windings interlinking each of said cores, apparatus for connecting one of the primary windings of each of said cores to a source of alternating current, other interconnecting means for connecting said second primary windings on each of said cores to a second source of alternating current having a different phase of substantially the same frequency as said first source, means including said interconnections and said primary windings for causing the flux in each of said respective cores to be of different magnitude for the different phases.

3. A frequency increasing system comprising a plurality of independent saturable magnetic flux paths, two primary windings interlinking each of said independent flux paths, apparatus for connecting one of the primary windings of each of said independent flux paths to a source of alternating current, other interconnecting means for connecting said second primary windings interlinking each of said independent flux paths to a second source of alternating current having a different phase of substantially the same frequency as said first source. means including said interconnections and said primary windings for causing the flux in each of said respective independent flux paths to be of different magnitude for the different phases while maintaining the total maximum flux through all of said independent flux paths substantially constant.

4. A static frequency changer comprising a plurality of saturable cores, a first winding interlinking said cores for inducing in each of a plurality of said cores periodically varying fluxes of different magnitudes, a second set of windings also interlinking said cores for inducing in said cores a second periodically varying flux of substantially the same frequency as said first flux but displaced in phase therefrom and an output circuit having induced therein voltages from each of said cores when the fluxes therethrough respectively pass through zero.

5. A static frequency changer comprising a plurality of saturable cores, a first set of windings interlinking said cores connected to one phase of a polyphase alternating current source for inducing alternating fluxes within said cores of different magnitudes in each of said cores, a second set of windings interlinking said cores connected to a second phase of said alternating current source for inducing in said cores a second alternating current flux out of phase of said first flux of complementary magnitude to the flux in said cores due to the first flux induced in said cores so that the maximum flux induced in each of said cores is substantially the same as induced in all other cores, an output circuit also interlinking said cores.

6. A harmonic frequency changer comprising a plurality of independent magnetic flux paths in saturable ferromagnetic material, apparatus for inducing saturating alternating current fluxes in each of said independent flux paths comprising a first set of windings connected to one phase of alternating current source and a second set of windings each individually interlinking one of said flux paths and connected to a second phase of an alternating current source, apparatus including said independent flux paths and said interconnections for causing the total flux in each of said independent flux paths to pass through zero at successively different instants of time.

7. A harmonic frequency changer comprising a plurality of saturable cores each providing an independent electromagnetic flux path, apparatus for inducing saturating alternating current fluxes in each of said independent flux paths comprising a first set of windings connected to one phase of alternating current source and a second set of windings interlinking each of said independent flux paths connected to a second phase of an alternating current source, apparatus including said independent flux paths and said interconnections for causing the total flux within each of said independent flux paths to pass through zero at successively different instants of time and at successive instants of time which are separated by substantially uniform intervals of time.

CLARENCE A. LOVELL.
DAVID B. PARKINSON.

REFERENCES CITED

The following references are of record in the file of this patent:

UNITED STATES PATENTS

| Number | Name | Date |
|---|---|---|
| 1,544,508 | Von Arco | June 30, 1925 |
| 1,597,937 | Wagner | Aug. 31, 1926 |
| 2,418,641 | Huge | Apr. 8, 1947 |
| 2,418,643 | Huge | Apr. 8, 1947 |
| 2,424,237 | Huge | July 22, 1947 |